(12) United States Patent
Numazaki et al.

(10) Patent No.: US 10,890,271 B2
(45) Date of Patent: Jan. 12, 2021

(54) SOLENOID VALVE DEVICE

(71) Applicant: JTEKT CORPORATION, Osaka (JP)

(72) Inventors: Kazushi Numazaki, Toyota (JP); Natsuki Iwamoto, Okazaki (JP); Toshikatsu Kubo, Obu (JP); Tomohiro Yasuoka, Nagoya (JP); Koji Kida, Toyota (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/297,879

(22) Filed: Mar. 11, 2019

(65) Prior Publication Data
US 2019/0285192 A1    Sep. 19, 2019

(30) Foreign Application Priority Data

Mar. 15, 2018 (JP) ................................ 2018-048286

(51) Int. Cl.
*F16K 31/06* (2006.01)
*F16K 31/00* (2006.01)

(52) U.S. Cl.
CPC .......... *F16K 31/0675* (2013.01); *F16K 31/00* (2013.01)

(58) Field of Classification Search
CPC ....... F16K 31/0675; F16K 31/00; F16K 27/29
See application file for complete search history.

(56) References Cited

U.S. PATENT DOCUMENTS

| 4,207,390 | A  | * | 6/1980  | Oehrlein | ............... | H01M 2/305 |
|           |    |   |         |          |                 | 29/623.2   |
| 7,559,794 | B2 | * | 7/2009  | Taguchi  | ..............  | F04B 27/1804 |
|           |    |   |         |          |                 | 439/127    |
| 8,568,919 | B2 | * | 10/2013 | Kim      | ........         | H01M 2/30  |
|           |    |   |         |          |                 | 429/178    |
| 9,657,864 | B2 | * | 5/2017  | Zelano   | .................| F02M 59/466 |

(Continued)

FOREIGN PATENT DOCUMENTS

| EP | 1 783 869 A1 | 5/2007 |
| EP | 2 896 857 A1 | 7/2015 |

(Continued)

OTHER PUBLICATIONS

Aug. 1, 2019 Extended Search Report issued in European Patent Application No. 19162829.6.

*Primary Examiner* — Eric Keasel
(74) *Attorney, Agent, or Firm* — Oliff PLC (57) ABSTRACT

A solenoid valve device includes a body including a gas passage and an accommodation portion communicating with the gas passage, a solenoid valve that is accommodated in the accommodation portion and that controls flow of gas by opening and closing the gas passage, a sealing member disposed between the accommodation portion and the solenoid valve to maintain airtightness of the gas passage, and a solenoid that generates power for the solenoid valve to open and close the gas passage, wherein the body is provided with a communication hole that allows communication between inside and outside of the accommodation portion; the solenoid includes a connection terminal portion (Continued)

FIG.1 extending toward the communication hole; and a connector is accommodated in the communication hole in a manner such that rotation of the connector in a circumferential direction about an axis of the communication hole is suppressed.

2 Claims, 4 Drawing Sheets

(56) References Cited

U.S. PATENT DOCUMENTS

| | | |
|---|---|---|
| 10,006,559 B2 * | 6/2018 | Kubo .................... F16K 31/408 |
| 2007/0184697 A1 | 8/2007 | Taguchi et al. |
| 2012/0028112 A1 | 2/2012 | Kim |
| 2014/0217316 A1 | 8/2014 | Zelano et al. |
| 2015/0198261 A1 | 7/2015 | Kubo et al. |

FOREIGN PATENT DOCUMENTS

| | | |
|---|---|---|
| JP | S56-113873 A | 9/1981 |
| JP | 2010-196895 A | 9/2010 |
| JP | 2015-132348 A | 7/2015 |

* cited by examiner

BIASING DIRECTION
OF LEAF SPRING

BIASING DIRECTION
OF LEAF SPRING

SOLENOID VALVE DEVICE

INCORPORATION BY REFERENCE

The disclosure of Japanese Patent Application No. 2018-048286 filed on Mar. 15, 2018 including the specification, drawings and abstract, is incorporated herein by reference in its entirety.

BACKGROUND OF THE INVENTION

1. Field of the Invention

The present invention relates to a solenoid valve device.

2. Description of Related Art

In the related art, there is known a solenoid valve device that regulates the pressure of high-pressure gas such as hydrogen gas used in a fuel cell vehicle (see Japanese Patent Application Publication No. 2015-132348 (JP 2015-132348 A)). The solenoid valve device includes a body and a solenoid valve. The body includes a gas passage through which gas flows, and an accommodation portion communicating with the gas passage. The solenoid valve controls the flow of hydrogen gas in the gas passage by opening and closing the gas passage. The accommodation portion of the body accommodates the solenoid valve. A sealing member such as an O-ring is disposed between the solenoid valve and the accommodation portion of the body. Thus, airtightness between the body and the solenoid valve is secured, and hence airtightness of the gas passage is maintained.

The solenoid valve includes a cylindrical solenoid. A connection line extends from one axial end of the solenoid. The connection line is routed to the outside of the solenoid valve device via a grommet accommodated in a communication hole provided in the body.

In the solenoid valve device described above, the solenoid valve may rotate in a circumferential direction about the axis of the solenoid. Therefore, the sealing member disposed between the solenoid valve and the body wears as the solenoid valve rotates. To suppress rotation of the solenoid valve described above, for example, a connection terminal that projects from one axial end of the solenoid may be provided in place of the connection line extending from the solenoid, and the connection terminal is inserted into a connector that is provided in place of the grommet.

Japanese Patent Application Publication No. 2010-196895 (JP 2010-196895 A) describes a solenoid valve device in which a connection terminal connected to a solenoid of a solenoid valve is inserted into a connector extending along the axis of the solenoid. Similar to the solenoid valve of JP 2015-132348 A, the solenoid valve of JP 2010-196895 A rotates in the circumferential direction. That is, the connector of the solenoid valve device described in JP 2010-196895 A may rotate with the solenoid valve in the circumferential direction. In the case where the solenoid valve rotates with the connector as described above, if a sealing member is disposed between the solenoid valve and the body as disclosed in JP 2015-132348 A, the sealing member wears.

SUMMARY OF THE INVENTION

An object of the present invention is to reduce wear of a sealing member disposed between a solenoid valve and a body.

According to an aspect of the present invention, there is provided a solenoid valve device including: a body including a gas passage through which gas flows, and an accommodation portion communicating with the gas passage; a solenoid valve that is accommodated in the accommodation portion, and that controls flow of the gas in the gas passage by opening and closing the gas passage; a sealing member disposed between the accommodation portion and the solenoid valve to maintain airtightness of the gas passage; and a cylindrical solenoid that receives electricity and generates power for the solenoid valve to open and close the gas passage, wherein: the body is provided with a communication hole that allows communication between inside and outside of the accommodation portion; the solenoid includes a connection terminal portion extending toward the communication hole; and a connector into which the connection terminal portion is inserted is accommodated in the communication hole in a manner such that rotation of the connector in a circumferential direction about an axis of the communication hole is suppressed, the connector being connected to a power supply that supplies electricity to the solenoid via the connection terminal portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
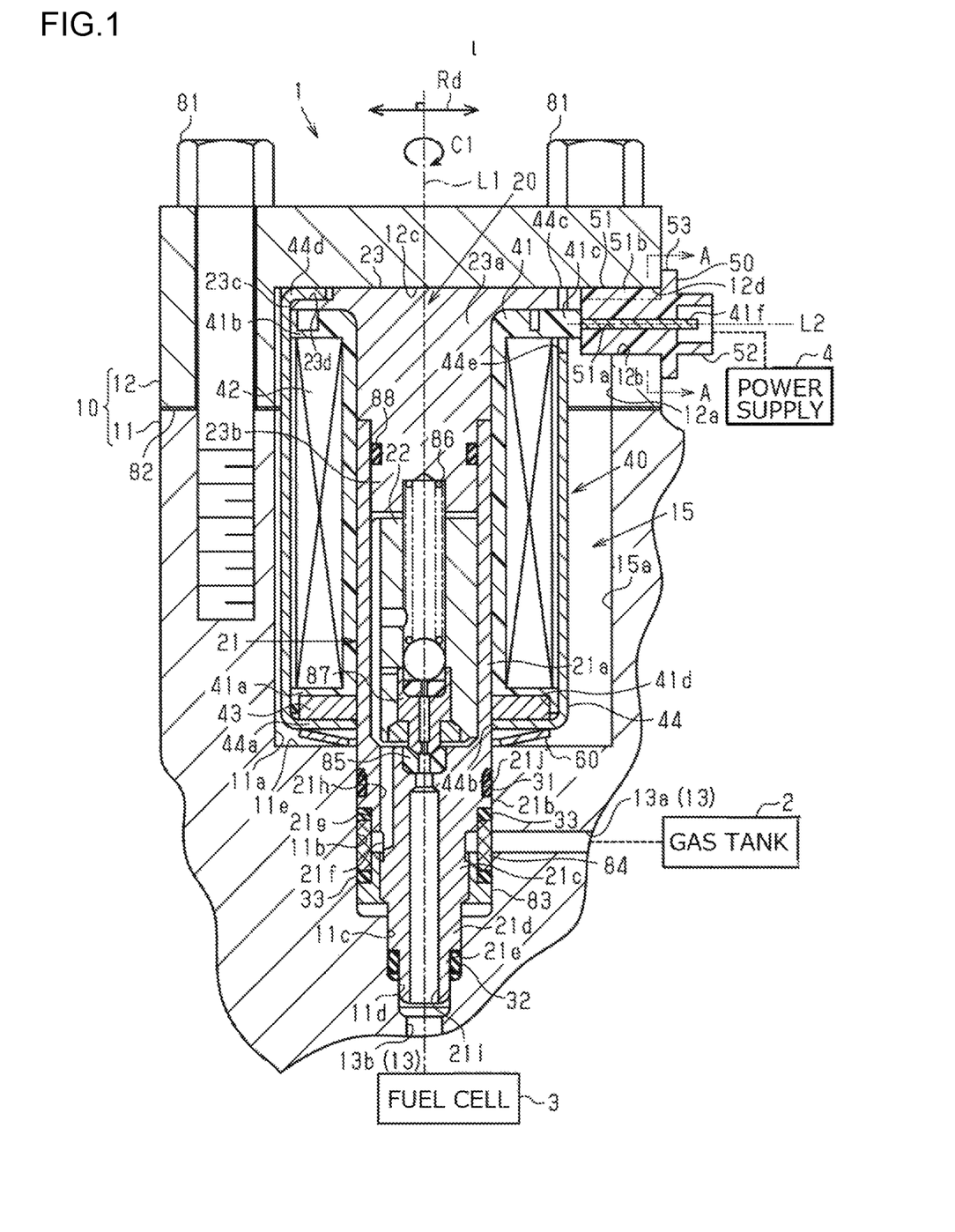
FIG. 1 is a sectional view illustrating a solenoid valve device.

Hereinafter, an embodiment of a solenoid valve device will be described. As illustrated in FIG. 1, a solenoid valve device 1 is attached to a gas tank 2 and controls the flow of hydrogen gas to be supplied to a fuel cell 3 mounted on a fuel cell vehicle. The gas tank 2 stores hydrogen gas at high pressure (about 70 MPa, for example).

The solenoid valve device 1 includes a body 10, a solenoid valve 20, a solenoid 40, and a connector 50. The body 10 has a gas passage 13 that allows communication between the gas tank 2 and the fuel cell 3 and through which hydrogen gas flows, and an accommodation portion 15 communicating with the gas passage 13. The body 10 includes a main body 11, and a cover 12 attached to the main body 11 by fastening members 81 such as bolts. A gasket 82 is interposed between the main body 11 and the cover 12 so as to maintain airtightness between the inside and outside of the body 10.

The gas passage 13 is provided in the main body 11. The gas passage 13 includes a supply passage 13a communicating with the gas tank 2, and a discharge passage 13b communicating with the fuel cell 3. The main body 11 includes a bottomed cylindrical first solenoid accommodation portion 11a, a bottomed cylindrical first sleeve accommodation portion 11b, a bottomed cylindrical second sleeve accommodation portion 11c, and a cylindrical third sleeve accommodation portion 11d. The first sleeve accommodation portion 11b is open to a bottom 11e of the first solenoid accommodation portion 11a, and communicates with the supply passage 13a. The second sleeve accommodation portion 11c is open to the bottom of the first sleeve accommodation portion 11b. The third sleeve accommodation portion 11d is open to the bottom of the second sleeve accommodation portion 11c, and communicates with the discharge passage 13b. The first solenoid accommodation portion 11a, the sleeve accommodation portions 11b, 11c, and 11d, and the discharge passage 13b are disposed coaxially. The first solenoid accommodation portion 11a, and the sleeve accommodation portions 11b, 11c, and 11d have successively smaller inner diameters from the cover 12 side of the body 10 toward the discharge passage 13b. The bottom 11e is an example of a first wall portion.

The cover 12 has a bottomed cylindrical shape. The cover 12 includes a bottomed cylindrical second solenoid accommodation portion 12a that is open to the main body 11. The cover 12 is disposed such that the opening of the second solenoid accommodation portion 12a is aligned with the opening of the first solenoid accommodation portion 11a. The first solenoid accommodation portion 11a and the second solenoid accommodation portion 12a define a solenoid accommodation portion 15a. The solenoid accommodation portion 15a and the sleeve accommodation portions 11b, 11c, and 11d define the accommodation portion 15.

The cover 12 is provided with a communication hole 12b that allows communication between the inside and outside of the accommodation portion 15. The communication hole 12b accommodates the connector 50. The connector 50 is connected to a power supply 4 provided outside the solenoid valve device 1 to supply electricity to the solenoid 40.

The solenoid valve 20 controls the flow of hydrogen gas in the gas passage 13 by opening and closing the gas passage 13. The solenoid valve 20 is accommodated in the accommodation portion 15 of the body 10. The solenoid valve 20 includes a sleeve 21, a movable core 22, and a fixed core 23. The components of the solenoid valve 20 are disposed coaxially with the accommodation portion 15.

The sleeve 21 has a bottomed cylindrical shape. The sleeve 21 includes a cylindrical portion 21a having a constant outer diameter and a constant inner diameter, and a base columnar portion 21b provided integrally with an end of the cylindrical portion 21a. The base columnar portion 21b has a stepped columnar shape whose outer diameter decreases stepwise toward the discharge passage 13b of the body 10. The base columnar portion 21b includes a large diameter portion 21c accommodated in the first sleeve accommodation portion 11b, an intermediate diameter portion 21d accommodated in the second sleeve accommodation portion 11c, and a small diameter portion 21e accommodated in the third sleeve accommodation portion 11d.

The outer peripheral surface of the large diameter portion 21c includes a communication groove 21f extending in a circumferential direction C1 about the axis of the sleeve 21. The communication groove 21f is disposed in a position facing the supply passage 13a at the inner periphery of the first sleeve accommodation portion 11b. An annular groove defining member 83 is press-fitted on a discharge passage 13b side in the communication groove 21f. A shallow groove 21g extending in the circumferential direction C1 is provided on a side away from the discharge passage 13b in the communication groove 21f. The depth of the shallow groove 21g in a radial direction Rd orthogonal to the axis of the sleeve 21 is less than the depth of the communication groove 21f. A metal mesh filter 84 is provided on the outer peripheral side of the communication groove 21f while being interposed between the shallow groove 21g and the groove defining member 83 via annular sealing members 33 such as gaskets. The large diameter portion 21c includes an inlet passage 21h that allows communication between the communication groove 21f and the inside of the cylindrical portion 21a. The inlet passage 21h extends in the direction in which the axis of the sleeve 21 extends. The inlet passage 21h is disposed in the position shifted outward in the radial direction Rd from the axis of the sleeve 21. The large diameter portion 21c includes an outlet passage 21i that allows communication between the inside of the cylindrical portion 21a and the discharge passage 13b. The outlet passage 21i extends in the direction in which the axis of the sleeve 21 extends. An annular valve seat 85 is fixed to an open end of the outlet passage 21i in the cylindrical portion 21a.

A groove 21j accommodating an annular sealing member 31 such as an O-ring is provided on the outer peripheral surface of the large diameter portion 21c on the cover 12 side with respect to the filter 84. The sealing member 31 is compressed between the bottom surface of the groove 21j of the large diameter portion 21c and the inner peripheral surface of the first sleeve accommodation portion 11b. An annular sealing member 32 such as an O-ring is also compressed between the outer peripheral surface of the small diameter portion 21e and the inner peripheral surface of the second sleeve accommodation portion 11c. That is, the airtightness of the gas passage 13 is maintained by the sealing members 31 and 32.

The movable core 22 has a columnar shape. The outer diameter of the movable core 22 is equal to the inner diameter of the cylindrical portion 21a of the sleeve 21. The movable core 22 is accommodated in the cylindrical portion 21a so as to be movable in the axial direction thereof. The movable core 22 is biased by a coil spring 86 toward the valve seat 85. The movable core 22 includes, as an integral part thereof, a valve element 87 that moves to and away from the valve seat 85 to close and open the outlet passage 21i. The movable core 22 of the present embodiment has a mechanism generally known as a pilot valve mechanism, which allows a small amount of hydrogen gas to flow between the inside of the cylindrical portion 21a and the outlet passage 21i before the valve element 87 moves away from the valve seat 85 as the movable core 22 moves along its axis.

The fixed core 23 has a stepped columnar shape. The fixed core 23 includes a base portion 23a, a press-fitted portion 23b, and a flange portion 23c. The press-fitted portion 23b extends from one end of the base portion 23a towards the sleeve 21. The flange portion 23c extends outwardly in the radial direction Rd from the other end of the base portion 23a. The outer diameter of the press-fitted portion 23b is slightly greater than the inner diameter of the cylindrical portion 21a of the sleeve 21. The outer diameter of the base portion 23a is equal to the outer diameter of the cylindrical portion 21a. A positioning groove 23d is provided on the outer periphery of an end face of the flange portion 23c on the cover 12 side. The press-fitted portion 23b of the fixed core 23 is press-fitted in the cylindrical portion 21a. A sealing member 88 such as an O-ring is interposed between the outer peripheral surface of the press-fitted portion 23b and the inner peripheral surface of the cylindrical portion 21a.

The solenoid 40 receives electricity and generates power for the solenoid valve 20 to open and close the gas passage 13. The solenoid 40 is accommodated in the solenoid accommodation portion 15a of the body 10. The solenoid 40 includes a cylindrical bobbin 41, a winding 42 wound around the bobbin 41, an annular yoke 43, and a bottomed cylindrical case 44. The components of the solenoid 40 are disposed coaxially about an axis L1 thereof. The axis L1 coincides with the axis of the solenoid valve 20 described above.

The inner diameter of the bobbin 41 is equal to the outer diameters of the cylindrical portion 21a of the sleeve 21 and the base portion 23a of the fixed core 23. The bobbin 41 includes flange portions 41a and 41b extending outwardly in the radial direction Rd at opposite ends in the direction along the axis L1. The outer diameters of the flange portions 41a and 41b are equal to the outer diameter of the flange portion 23c of the fixed core 23. A bottomed cylindrical yoke accommodation portion 41d is provided on the bottom 11e side of the solenoid accommodation portion 15a of the bobbin 41. A columnar terminal portion 41c accommodating a lead of the winding 42 extends outwardly in the radial direction Rd, from the flange portion 41b provided on the cover 12 side of the bobbin 41. The terminal portion 41c is disposed in a position corresponding to the communication hole 12b of the cover 12 in the radial direction Rd. Connection terminals 41f connected to the lead of the winding 42 are fixed to the terminal portion 41c. The connection terminals 41f extend toward the communication hole 12b. The yoke 43 is accommodated in the yoke accommodation portion 41d of the flange portion 41a. The inner diameter of the yoke 43 is equal to the outer diameter of the cylindrical portion 21a. Accordingly, the yoke 43 is fixed by being interposed between the inner peripheral surface of the yoke accommodation portion 41d and the outer peripheral surface of the cylindrical portion 21a. The connection terminals 41f are an example of a connection terminal portion. Although not illustrated, two connection terminals 41f are provided on the terminal portion 41c in the present embodiment.

The case 44 positions the solenoid 40 and the solenoid valve 20. The case 44 accommodates part of the solenoid valve 20, the bobbin 41, the winding 42, and the yoke 43. The inner diameter of the case 44 is equal to the outer diameter of the flange portions 41a and 41b of the bobbin 41. The outer diameter of the case 44 is less than the inner diameter of the solenoid accommodation portion 15a. A through-hole 44b having an inner diameter equal to the outer diameter of the cylindrical portion 21a is provided at a bottom 44a of the case 44 on the bottom 11e side. A tab 44d is provided at an open end 44c of the case 44 on the cover 12 side. The tab 44d is bent to abut the positioning groove 23d of the fixed core 23. Thus, the solenoid 40 is positioned with respect to the solenoid valve 20. An insertion portion 44e is provided at the open end 44c of the case 44. The terminal portion 41c of the bobbin 41 is inserted into the insertion portion 44e. The open end 44c and a cover-12-side end of the tab 44d of the case 44 abut a bottom 12c of the second solenoid accommodation portion 12a of the cover 12 facing the bottom 11e. The bottom 12c is an example of a second wall portion. The bottom 44a is an example of one end of the solenoid 40. The open end 44c and the cover-12-side end of the tab 44d are an example of the other end of the solenoid 40.

A leaf spring 60 serving as a biasing member is disposed between the bottom 44a of the case 44 and the bottom 11e of the accommodation portion 15 (first solenoid accommodation portion 11a) facing the bottom 44a, in the direction in which the axis L1 extends. The leaf spring 60 biases the bottom 44a of the case 44 toward the bottom 12c of the cover 12. Accordingly, the open end 44c of the case 44 and the cover-12-side end of the tab 44d are biased against the bottom 12c of the cover 12.

Figure 2:
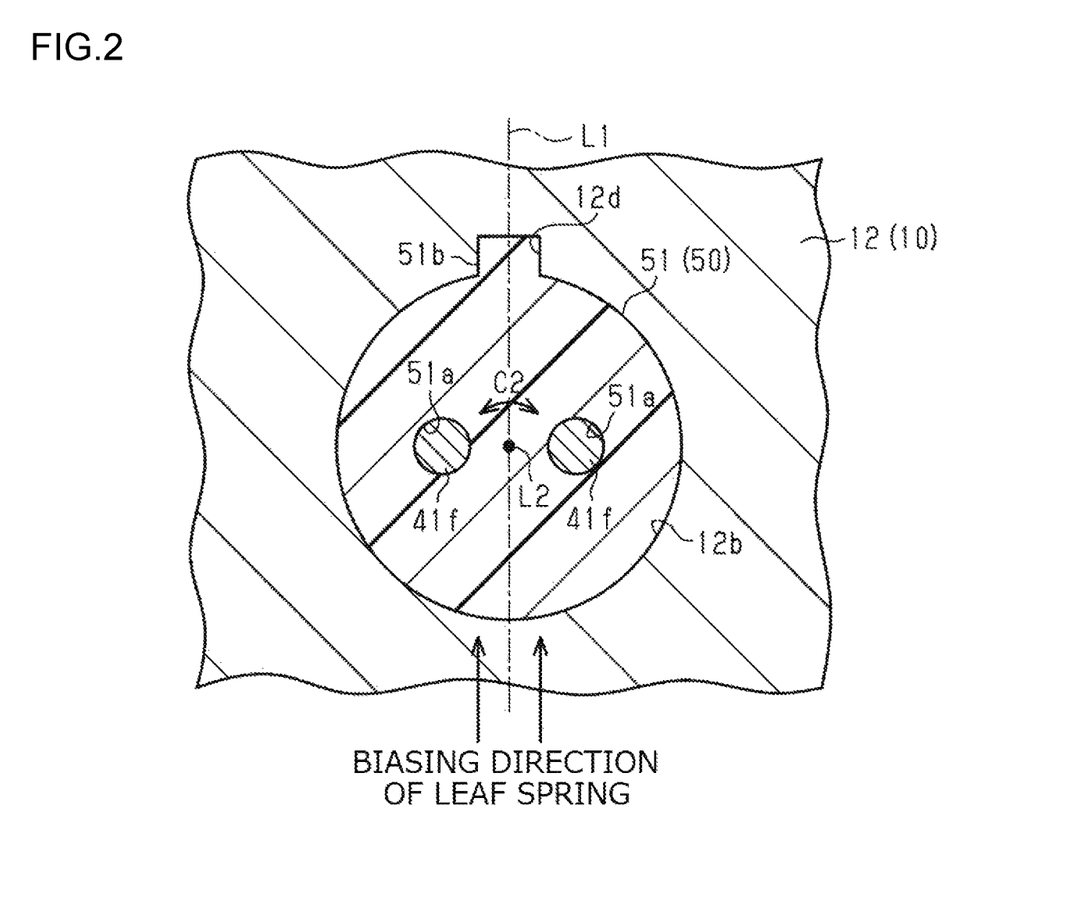
FIG. 2 is a cross-sectional view taken along line A-A of FIG. 1.

The following describes the configuration around the connector 50 in detail. As illustrated in FIGS. 1 and 2, the communication hole 12b of the cover 12 is provided such that an axis L2 of the communication hole 12b is orthogonal to the axis L1 of the solenoid 40. A cutout groove 12d is provided on the inner peripheral surface of the communication hole 12b. The cutout groove 12d extends throughout the length of the inner peripheral surface of the communication hole 12b along the axis L2. The depth direction of the cutout groove 12d coincides with the direction in which the leaf spring 60 biases the case 44 of the solenoid 40.

The connector 50 includes a columnar portion 51, a connector portion 52, and a flange portion 53 that are disposed coaxially about the axis L2. The columnar portion 51 is accommodated in the communication hole 12b. The columnar portion 51 is provided with insertion holes 51a for insertion of the respective connection terminals 41f. The insertion holes 51a extend in the direction in which the axis L2 extends. An end of the columnar portion 51 on the inner side of the body 10 abuts the terminal portion 41c of the bobbin 41. The connector portion 52 has a bottomed cylindrical shape. The bottom of the connector portion 52 defines the end of the columnar portion 51 on the outer side of the body 10. Distal ends of the respective connection terminals 41f inserted into the insertion holes 51a of the columnar portion 51 project into the connector portion 52. Thus, when the power supply 4 is connected to the connector portion 52 of the connector 50, electricity is supplied to the solenoid 40 via the connection terminals 41f. The flange portion 53 has an annular shape. The flange portion 53 is provided at the boundary between the columnar portion 51 and the connector portion 52. The flange portion 53 extends along the outer peripheral surface of the cover 12 from the outer peripheral surface of the end of the columnar portion 51 on the outer side of the body 10. The flange portion 53 serves to suppress excessive insertion of the columnar portion 51 of the connector 50 into the communication hole 12b.

A projection 51b projecting radially outward of the columnar portion 51 from the outer peripheral surface of the columnar portion 51 is provided on the outer periphery of the columnar portion 51 of the connector 50. The projection 51b has a shape corresponding to the cutout groove 12d of the communication hole 12b. The projection direction of the projection 51b coincides with the direction in which the leaf spring 60 biases the case 44 of the solenoid 40. The projection 51b is fitted into the cutout groove 12d. That is, the connector 50 is accommodated in the communication hole 12b of the cover 12 while being suppressed from rotating in the circumferential direction C2.

The following describes the operation of the solenoid valve 20. In the solenoid valve 20, when driving current is not supplied to the winding 42 via the connector 50, the movable core 22 is biased toward the valve seat 85 by the biasing force of the coil spring 86 and pressure of hydrogen gas. When the valve element 87 comes into contact with the valve seat 85, the outlet passage 21i is closed. In this state, hydrogen gas supplied from the supply passage 13a reaches the cylindrical portion 21a through the communication groove 21f and the inlet passage 21h, but is not supplied to the discharge passage 13b. When driving current is supplied to the winding 42 via the connector 50, the movable core 22 is attracted by the fixed core 23. Thus, the movable core 22 moves in a direction away from the valve seat 85 against the biasing force of the coil spring 86. When the valve element 87 moves away from the valve seat 85, the outlet passage 21*i* is opened. In this state, hydrogen gas supplied from the supply passage 13*a* reaches the cylindrical portion 21*a* through the communication groove 21*f* and the inlet passage 21*h*, is fed to the discharge passage 13*b* through the outlet passage 21*i*, and then is supplied to the fuel cell 3.

The advantageous effects of the present embodiment will be described.

(1) Even if the solenoid valve 20 attempts to rotate in the circumferential direction C1 about the axis L1 of the solenoid 40, the connection terminals 41*f* of the solenoid 40 interfere with the body 10 via the connector 50, so that rotation of the solenoid valve 20 is suppressed. Further, rotation of the connector 50 in the circumferential direction C2 about the axis L2 of the communication hole 12*b* is suppressed. Therefore, even if the connector 50 might rotate together with the solenoid valve 20 in the circumferential direction C1, it is possible to suppress rotation of the solenoid 40 of the solenoid valve 20 in the circumferential direction C1. This makes it possible to reduce wear between the connector 50 and the body 10 due to rotation of the connector 50 and to suppress entrance of foreign matter into the body 10 due to the wear, while reducing wear of the sealing members 31, 32, and 33 disposed between the solenoid valve 20 and the body 10.

(2) When the solenoid 40 moves along the axis L1 in the accommodation portion 15 of the body 10, stress is generated in the connection terminals 41*f* of the solenoid 40 because the connection terminals 41*f* are inserted into the connector 50.

In view of the above, the open end 44*c* and the cover-12-side end of the tab 44*d* of the case 44 of the solenoid 40 is pressed against the bottom 12*c* of the second solenoid accommodation portion 12*a* by the biasing force of the leaf spring 60. Therefore, it is possible to suppress movement of the solenoid 40 along the axis L1, and to reduce stress generated in the connection terminals 41*f*.

(3) To suppress rotation of the connector 50 in the circumferential direction C2, the inner periphery of the communication hole 12*b* and the outer periphery of the connector 50 may be formed into a polygonal shape or an elliptical shape, for example. However, forming the inner periphery of the communication hole 12*b* and the outer periphery of the connector 50 into a polygonal shape or an elliptical shape requires high accuracy in manufacture of the solenoid valve device 1.

In view of the above, in the present embodiment, the projection 51*b* of the connector 50 is fitted into the cutout groove 12*d* of the communication hole 12*b*. Therefore, by simply fitting the projection 51*b* of the connector 50 into the cutout groove 12*d* of the communication hole 12*b*, it is possible to suppress rotation of the connector 50 in the circumferential direction C2.

(4) The depth direction of the cutout groove 12*d* and the projection direction of the projection 51*b* coincide with the direction in which the leaf spring 60 biases the solenoid 40. Therefore, the solenoid 40 is biased by the leaf spring 60. Thus, the connector 50 is biased via the connection terminals 41*f* in the direction in which the leaf spring 60 biases the solenoid 40. That is, compared to a configuration without the leaf spring 60, the projection 51*b* of the connector 50 is more tightly fitted into the cutout groove 12*d* of the communication hole 12*b*. Accordingly, it is possible to more reliably suppress rotation of the connector 50 in the circumferential direction C2.

(5) For example, in the case of adopting the configuration in which the connection line extending from the solenoid 40 of the present embodiment is routed to the outside of the solenoid valve device 1 via the communication hole 12*b*, the arrangement of the connection line outside the solenoid valve device 1 needs to be considered.

In view of the above, in the present embodiment, the connection terminals 41*f* and the connector 50 are used in place of the connection line extending from the solenoid 40, so that connection to and disconnection from the outside power supply 4 can be carried out at the connector 50. Accordingly, compared to the case of adopting the configuration in which the connection line extends from the solenoid 40, it is possible to reduce man-hours in arranging the connection line.

The present embodiment may be implemented with the following modifications. The present embodiment and the following modifications may be combined as long as no technical inconsistency arises.

In the present embodiment, when the projection 51*b* is fitted into the cutout groove 12*d*, rotation of the connector 50 in the circumferential direction C2 is suppressed. Accordingly, the depth direction of the cutout groove 12*d* and the projection direction of the projection 51*b* do not have to coincide with the direction in which the leaf spring 60 biases the solenoid 40.

In the present embodiment, each of the cutout groove 12*d* and the projection 51*b* may be provided in plurality. With this modified configuration as well, it is possible to suppress rotation of the connector 50 in the circumferential direction C2.

In the present embodiment, in order to suppress rotation of the connector 50 in the circumferential direction C2, the following configuration may be employed.

Figure 3:
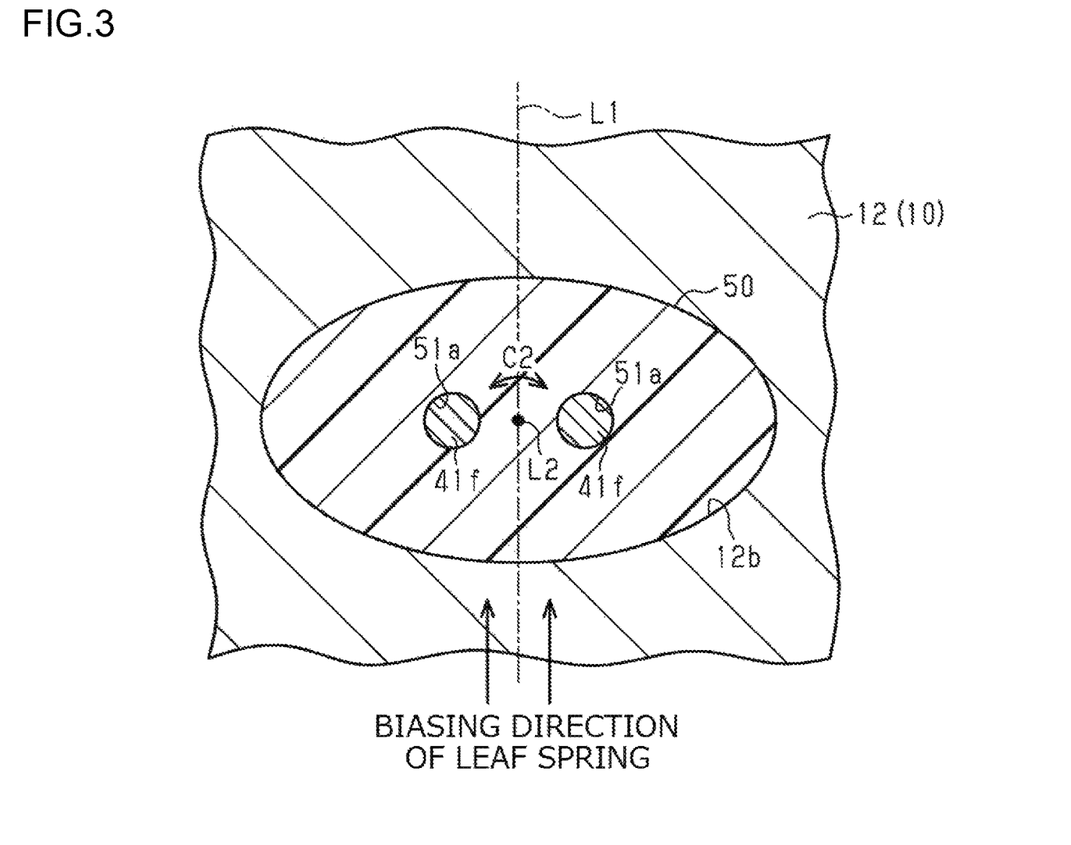
FIG. 3 is a cross-sectional view illustrating a connector in a modification of the solenoid valve device.

As illustrated in FIG. 3, the connector 50 may be modified such that a cross-sectional shape thereof in a direction orthogonal to the axis L2 is elliptical. In this case, the inner peripheral shape of the communication hole 12*b* may also be elliptical. The cross-sectional shape of the connector 50 in a direction orthogonal to the axis L2 is not limited to an elliptical shape, and may be a polygonal shape or any other shape as long as the connector 50 does not rotate in the circumferential direction C2.

In the present embodiment, an elastic member such as an annular rubber plate may be used in place of the leaf spring 60. Various modifications may be made as long as the solenoid 40 is pressed against the bottom 12*c* of the cover 12 by a biasing force of an elastic member. Alternatively, the leaf spring 60 and the elastic member may be omitted. In this case, for example, the solenoid 40 is fixed between the bottom 12*c* of the cover 12 and the bottom 11*e* of the first solenoid accommodation portion 11*a*. As long as stress generated in the connection terminals 41*f* due to the movement of the solenoid 40 along the axis L1 is small, a small space may be provided between the bottom 44*a* of the case 44 of the solenoid 40 and the bottom 11*e* of the first solenoid accommodation portion 11*a*.

In the present embodiment, the communication hole 12*b* is provided such that the axis L2 thereof is orthogonal to the axis L1 of the solenoid 40. However, the communication hole 12*b* may be provided such that the axis L2 crosses the axis L1, for example. The communication hole 12*b* does not have to be provided such that the axis L2 crosses the axis L1. For example, the communication hole 12*b* may be provided such that the axis L2 is parallel to the axis L1. Even with this configuration, it is possible to suppress rotation of the connector 50 in the circumferential direction C2 about the axis L2 of the communication hole 12*b*.

In the present embodiment, the solenoid 40 includes the case 44. However, the case 44 may be omitted. In this case, the flange portion 23c of the fixed core 23 may be omitted. In this case, if the leaf spring 60 is employed, a portion of the yoke 43 facing the bottom 11e of the first solenoid accommodation portion 11a is one end of the solenoid 40, and a portion of the flange portion 41b of the bobbin 41 facing the bottom 12c of the cover 12 is the other end of the solenoid 40.

In the present embodiment, the connection terminals 41f are inserted into the insertion holes 51a of the connector 50. However, the following configuration may be employed.

Figure 4:
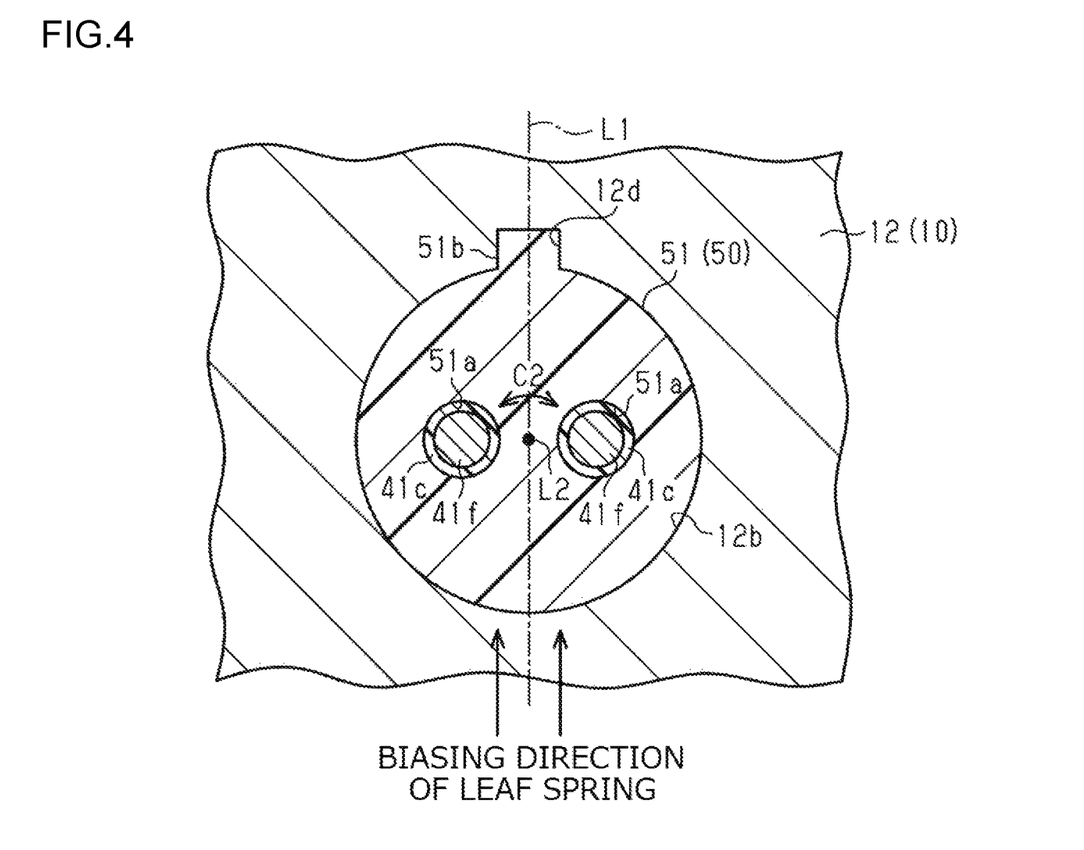
FIG. 4 is a cross-sectional view illustrating a connector in a modification of the solenoid valve device.

As illustrated in FIG. 4, the terminal portion 41c of the bobbin 41 may be modified to further cover the outer peripheral surface of each connection terminal 41f such that the terminal portion 41c and the connection terminal 41f are inserted into the corresponding insertion hole 51a of the connector 50. In this case, the terminal portion 41c and the connection terminals 41f are an example of a connection terminal portion.

In the present embodiment, only the connection terminals 41f are inserted into the connector 50. However, the present invention is not limited thereto. For example, a connection line connected to a temperature sensor that detects a temperature inside the gas tank 2 may extend from the inside of the accommodation portion 15 to the outside of the solenoid valve device 1 via the connector 50. In this case, the configuration may be appropriately modified such that the connector 50 can be connected not only to the power supply 4, but also to an ECU or the like to which information from the temperature sensor is input.

In the present embodiment, a sealing member may be interposed between the inner peripheral surface of the communication hole 12b and the outer peripheral surface of the connector 50 to maintain airtightness between the body 10 and the connector 50. With this modified configuration as well, it is possible to suppress rotation of the connector 50 in the circumferential direction C2, and to reduce wear of the sealing member.

The solenoid valve device 1 of the present embodiment is applied to a fuel cell vehicle. However, the solenoid valve device 1 may be applied to other external devices.

In the present embodiment, the solenoid valve device 1 is used to control the flow of high-pressure hydrogen gas. However, the solenoid valve device 1 may be used to control the flow of high-pressure gas other than hydrogen.

According to a solenoid valve device of the present embodiment, wear of a sealing member disposed between a solenoid valve and a body can be reduced.

What is claimed is:

1. A solenoid valve device comprising:
a body including a gas passage through which gas flows, and an accommodation portion communicating with the gas passage;
a solenoid valve that is accommodated in the accommodation portion, and that controls flow of the gas in the gas passage by opening and closing the gas passage;
a sealing member disposed between the accommodation portion and the solenoid valve to maintain airtightness of the gas passage; and
a cylindrical solenoid that receives electricity and generates power for the solenoid valve to open and close the gas passage, wherein:
the body is provided with a communication hole that allows communication between inside and outside of the accommodation portion;
the solenoid includes a connection terminal portion extending toward the communication hole;
a connector, into which the connection terminal portion is inserted, is accommodated in the communication hole such that rotation of the connector is prevented about an axis of the communication hole by interference between the connector and the communication hole, the connector being connected to a power supply that supplies electricity to the solenoid via the connection terminal portion;
the communication hole is provided such that the axis of the communication hole crosses an axis of the solenoid;
a biasing member is disposed between one end of the solenoid and a first wall portion of the accommodation portion facing the one end in a direction in which the axis of the solenoid extends;
the biasing member biases the other end of the solenoid opposite to the one end against a second wall portion of the accommodation portion facing the other end, in a direction in which the axis of the solenoid extends;
a cutout groove is formed on an inner peripheral surface of the communication hole;
a projection projecting from the connector and fitted into the cutout groove is provided on an outer periphery of the connector;
the communication hole is provided such that the axis of the communication hole is orthogonal to the axis of the solenoid; and
a depth direction of the cutout groove and a projection direction of the projection coincide with a direction in which the biasing member biases the solenoid.

2. The solenoid valve device according to claim 1, wherein:
the connection terminal portion interferes with the body via the connector to prevent rotation of the solenoid within the accommodation portion.

\* \* \* \* \*